I. SHMELSTEIN.
TOP FOR BICYCLES AND MOTOR CYCLES.
APPLICATION FILED FEB. 13, 1917.

1,254,858.

Patented Jan. 29, 1918.

Inventor:
Isaac Shmelstein.
By Silas Sweet.
Atty

UNITED STATES PATENT OFFICE.

ISAAC SHMELSTEIN, OF MASON CITY, IOWA.

TOP FOR BICYCLES AND MOTOR-CYCLES.

1,254,858.  Specification of Letters Patent.  Patented Jan. 29, 1918.

Application filed February 13, 1917. Serial No. 148,445.

*To all whom it may concern:*

Be it known that I, ISAAC SHMELSTEIN, a subject of the Czar of Russia, and resident of Mason City, Cerro Gordo county, Iowa, have invented a new and useful Top for Bicycles and Motor-Cycles, of which the following is a specification.

The object of this invention is to provide an improved construction of tops for vehicles such as bicycles and motorcycles.

A further object of this invention is to provide an improved construction for a supporting frame adapted to be carried by a vehicle and, in turn, adapted to carry a removable and replaceable top or cover.

A further object of this invention is to provide an improved construction for a top or cover which may be rolled when not in use, and is adapted to be detachably secured to a suitable supporting frame.

My invention consists in the construction, arrangement and combination of elements hereinafter set forth, pointed out in my claims and illustrated by the accompanying drawing, in which—

Figure 1:
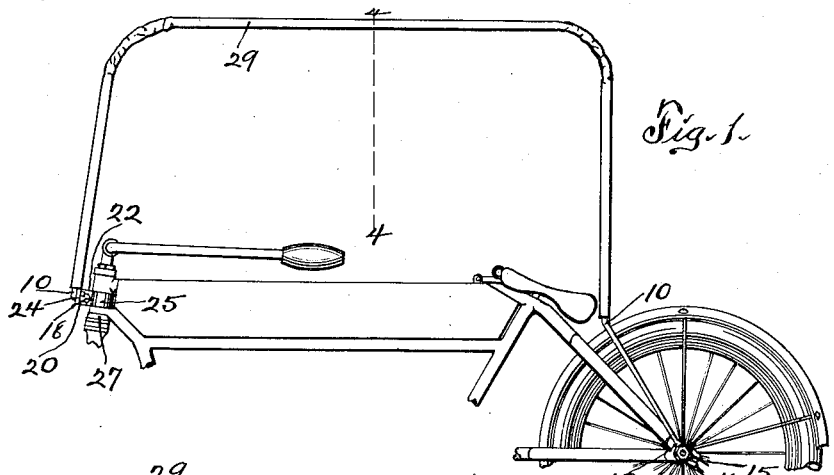
Figure 2:
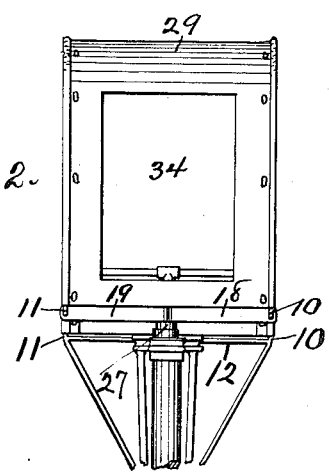
Figure 3:
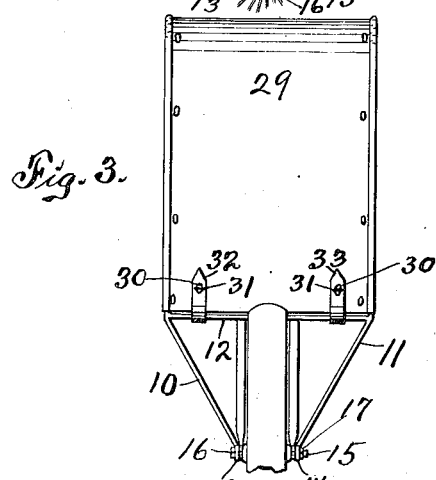
Figure 4:
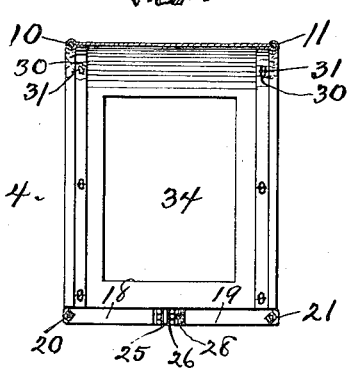
Figure 5:
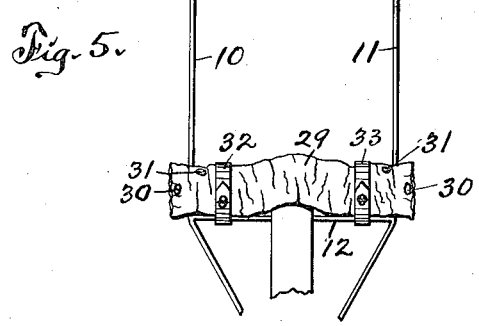
Figure 6:
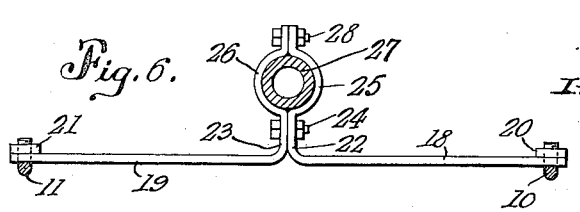

Figure 1 is a side elevation showing my improved device mounted as required for practical use. Fig. 2 is a front elevation and Fig. 3 a rear elevation of the same, so much only of the vehicle being shown as will properly show the application of my device to one form thereof. Fig. 4 is a cross-section on the indicated line 4—4 of Fig. 1. Fig. 5 is a rear elevation of the frame showing the cover rolled and stowed on the frame for transportation when not in use. Fig. 6 is a plan, partly in section, on an enlarged scale, illustrating means employed to connect the top frame to a steering head, the latter being shown conventionally.

In the construction of the device as shown the numerals 10, 11 designate mating frame members, each preferably made of a single length of steel bar round in cross-section. The members 10, 11 preferably are spaced apart a distance approximating or equal to the extreme width of a motorcycle or bicycle and are of generally flat-arched form. The rearmost legs of the members 10, 11 are connected integrally by a cross-bar 12 at a distance from the extremities thereof, and said rear legs terminate in eyes 13, 14 adapted to embrace and be secured to a rear axle 15 by nuts 16, 17. The portions of the legs which carry the eyes 13, 14 and extend beyond the cross-bar 12 preferably are in converging planes. A yoke is mounted at the front end of the frame and is employed to connect the frame to the vehicle. The yoke (Fig. 6) is formed of two mating members having alining bars 18—19 apertured at their extreme ends to receive inturned end portions of the front legs of the members 10, 11 secured therein by nuts 20, 21. Arms 22, 23 are formed on the inner abutting ends of the bars 18, 19 and extend at right angles to the bars between the members 10, 11. The arms 22, 23 are connected by a bolt 24. Mating clamp members 25, 26 are formed on the arms 22, 23 and are adapted to engage and embrace the steering head 27 of the vehicle and be secured thereto by a clamping bolt 28. Thus is the front end portion of the frame secured to and supported by the steering head 27 of the vehicle. A cover 29, preferably made of a single sheet of waterproof material, such as oil cloth, canvas, leather or rubberized fabric, is mounted on the frame and extends from the bar 12 to the yoke. The long side marginal portions of the cover 29 are folded around the members 10, 11 between the bar 12 and yoke and are secured by fastening devices such as eyelets 30, in the margins, engaging over the turn-buttons 31 inwardly therefrom. The end portions of the cover 29 may be folded around the bar 12 and alining yoke bars 18, 19 and secured thereto by similar fastening devices. All of the fastening devices are on the inside and within the outline of the supporting frame. Straps 32, 33 may be secured to the rear end portion of the cover 29 and be employed to secure the cover to the rear bar 12; and the same straps may be employed to bind the cover in rolled or convolute condition and hang it on the rear bar for transportation when not in use. The cover may be removed and replaced as desired and when in place on the frame said cover protects a rider of the vehicle from sun, rain or other adverse action of the elements from above. While the frame members 10, 11 and yoke may be removed when desired, they normally constitute a part of the vehicle for general use.

A window 34 is provided in the front end portion of the cover 29.

I claim as my invention:—

1. A frame composed of mating arched members placed side by side and arranged in vertical planes on opposite sides of the median line of a motorcycle or bicycle, a cross-bar connecting said members near one end thereof, a yoke connecting said members at the other end thereof, a clamp on said yoke adapted to embrace a steering head of said motorcycle or bicycle, means for securing the opposite end of said frame to a rear axle of said motorcycle or bicycle, and a cover on said frame.

2. The combination of mating side frames unobstructed throughout the major portions of their lengths adapted to be placed side by side in vertical planes on opposite sides of the median line of a motorcycle or bicycle, a cover of weather-proof material adapted to be folded, at its side margins, over said frames and detachably secured thereto, and means for securing opposite end portions of said frames detachably to opposite end portions of said vehicle.

3. The combination of mating arched side frames, means independent of a cover or vehicle for connecting said frames adjacent to their ends, means for mounting said frames on and connecting the ends only thereof to a vehicle, and a detachable cover, adapted to be rolled when not in use, which cover is adapted to be folded around the frames between the connecting means and means for detachably connecting the folded portions of said cover.

4. A cover formed with a window in one end portion and straps at the opposite end portion, which cover is formed in each side margin with mating eyelets and buttons, said cover being adapted to be rolled convolutely from one end.

5. A frame composed of mating arched members placed side by side, an integral cross-bar connecting said members near one end thereof, end portions of said members beyond said cross-bar being arranged in converging planes and adapted to be secured to the rear axle of a motorcycle or bicycle, the forward ends of said members being turned inwardly and threaded to receive nuts, a yoke comprising mating members having alining bars apertured at their extreme ends to receive said inturned end portions of the frame members, said alining bars being formed with arms on their inner abutting ends which arms extend at right angles to the bars and are adapted to be connected by a bolt, said arms being formed with mating clamp members adapted to engage and embrace a steering head of said motorcycle or bicycle, said clamp members being adapted to be connected by a bolt.

6. A frame composed of mating arched members placed side by side, an integral cross-bar connecting said members near one end thereof, end portions of said members beyond said cross-bar being arranged in converging planes and adapted to be secured to the rear axle of a motorcycle or bicycle, the forward ends of said members being turned inwardly and threaded to receive nuts, a yoke comprising mating members having alining bars apertured at their extreme ends to receive said inturned end portions of the frame members, said alining bars being formed with arms on their inner abutting ends which arms extend at right angles to the bars and are adapted to be connected by a bolt, said arms being formed with mating clamp members adapted to engage and embrace a steering head of said motorcycle or bicycle, said clamp members being adapted to be connected by a bolt, together with a cover of weather-proof material adapted to be extended over and outside of said mating arched members, one end portion of said cover being provided with straps adapted to embrace said cross-bar and connect the cover thereto, the opposite end of said cover extending to said yoke, there being a window formed in the end portion of the cover adjacent to said yoke, the long side marginal portions of said cover being adapted to be folded around the mating arched side members of the frame between said cross-bar and yoke, said side marginal portions of the cover being provided with interengaging eyelets and buttons.

Signed by me at Mason City, Iowa, this fourth day of December, 1916.

ISAAC SHMELSTEIN.